April 21, 1942. T. A. BOWERS 2,280,745
SLOTTED PISTON RING
Filed Aug. 20, 1941
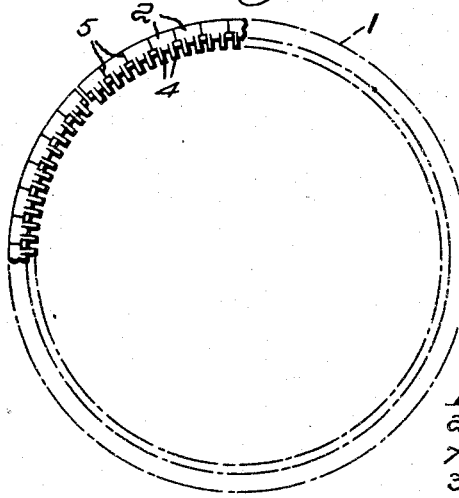
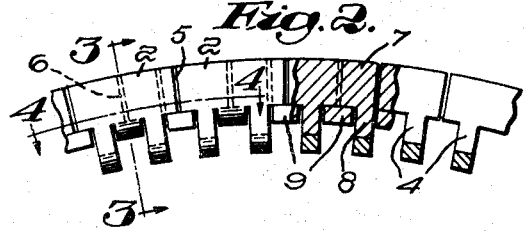
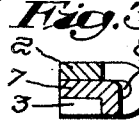
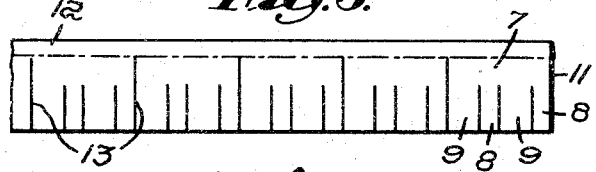
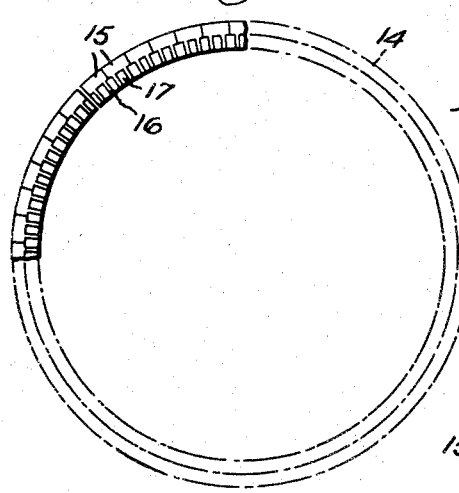
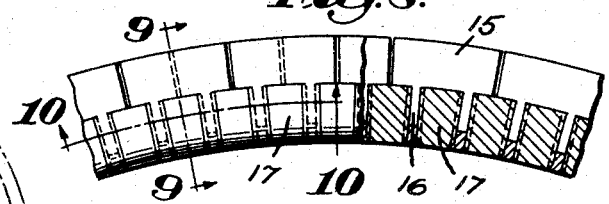
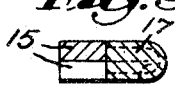
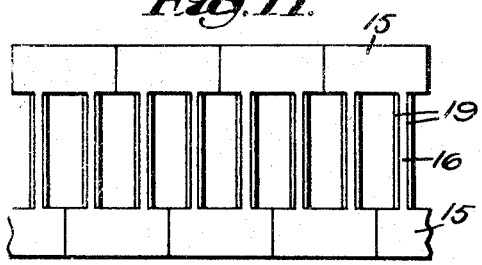
Inventor:
Thomas A. Bowers
Ulmer W. Hamilton
by
Attorney Patented Apr. 21, 1942

2,280,745

UNITED STATES PATENT OFFICE 2,280,745

SLOTTED PISTON RING

Thomas A. Bowers, Mattapoisett, Mass., assignor to Power Research Corporation, Boston, Mass., a corporation of Massachusetts Application August 20, 1941, Serial No. 407,576

9 Claims. (Cl. 309—44)

This invention relates to piston rings and more especially to flexible piston rings of the type formed from resilient piston ring materials.

An object of the invention is to improve piston rings and to devise substantially gas-tight ring structures made up of a plurality of segments of piston ring material connected together in minutely spaced-apart relation. Another object of the invention is to provide means for preventing passage of gases or other fluids radially through the spaces or gaps between the segments, and to further secure such means in fixed relation with respect to the ring. Another object is to provide filler and spacing means in rings of the type noted, while maintaining such rings substantially gas-tight with respect to gases directed both radially and axially against the ring. The invention also aims to set forth improved methods of making piston rings from a strip of piston ring material, and to provide piston ring structures which are of desirable flexible and extensible character, which operate with their ends in abutting relation, and which are cheap, easily assembled in a piston, efficient in operation, and of long operating life.

The nature of the invention and its objects will be more fully understood from the following description of the drawing and discussion relating thereto.

In the accompanying drawing:

Fig. 1 is a plan view of a piston ring of the invention;

Fig. 2 is a fragmentary enlarged plan view partially broken away to illustrate a lower portion of the ring;

Fig. 3 is a cross section taken on the line 3—3 of Fig. 2;

Fig. 4 is a cross section taken on the line 4—4 of Fig. 2;

Fig. 5 is a plan view of a strip of piston ring material utilized in carrying out a step in the method of making the ring of the invention;

Fig. 6 is a detail cross section illustrating further steps in the method referred to;

Fig. 7 is a plan view of a modified piston ring of the invention;

Fig. 8 is an enlarged plan view of the modified piston ring shown in Fig. 7;

Fig. 9 is a cross section taken on the line 9—9 of Fig. 8;

Fig. 10 is a cross section taken on the line 10—10 of Fig. 8;

Fig. 11 is an enlarged fragmentary plan view of a strip of piston ring material partially formed in accordance with the method of making the modified piston ring of Figs. 7-10 inclusive; and Fig. 12 is an enlarged fragmentary view of another strip of piston ring material utilized in the modified method of making a piston ring.

In an earlier patent, No. 2,224,338, issued to me December 10, 1940, I have described and claimed an improved oil control piston ring formed from a strip of resilient piston ring material such as a resilient steel or other suitable material. In making the ring of the patent referred to, portions of the strip are punched out to provide openings extending transversely within the edges of the strip. The edges of the strip are sheared to form slits or gaps which connect with the first formed openings. The gaps along one edge of the strip are staggered with relation to the gaps along an opposite edge, with the result that there are provided segments or crown portions occurring in staggered relation at opposite edges of the strip. The strip thus formed is folded longitudinally to provide a straight length of piston ring material of generally U-shaped cross section presenting spaced-apart oil scraping edges. The U-shaped strip is thereafter bent into an annular shape to constitute a piston ring.

The gaps provide for the segments being circumferentially spaced apart. When the ends of the ring are brought into abutting relation, the segments may be compacted against one another, thus decreasing the circumference of the ring. The resilient nature of the piston ring material tends to urge the segments back into their normal spaced-apart position, thus providing circumferential and radial extensibility in the ring. In practice a ring is employed slightly greater in circumference than the cylinder in which it reciprocates. The ring constantly operates in a slightly compacted position in which it develops a desirable wall pressure, which is exerted uniformly at all points in and around the cylinder irrespective of worn or irregular areas therein.

In accordance with the present invention, I provide a piston ring of somewhat the same general segment construction in which means are incorporated for rendering the ring substantially gas-tight with respect to passage of gases both radially and axially of the ring. A plurality of separate filler elements or pieces of piston ring material is incorporated with the ring at various points therein to overlie the gaps between the segments and also to fill in between the annular rows of segments, as well as their connecting portions. The filler elements seal the gaps, increase the axial height of the ring, close the spaces between the connecting portions, and provide other desirable results.

Referring more in detail to the drawing, numeral 1 denotes a flexible piston ring of somewhat the same type described in the above noted patent. The ring 1 is made up of an upper annular row of segments 2 and a lower annular row of segments 3, connected together by doubled-over connecting portions 4.

Each of the segments 2 and 3 has at least two connecting portions extending radially inward therefrom, and each of the two connecting portions of a respective segment is secured to separate segments at an opposite side of the ring. Other arrangements of connecting portions may be resorted to.

Numeral 5 indicates gaps or interstices occurring between the upper row of segments 2, and numeral 6 refers to gaps or interstices occurring, between the lower row of segments 3, in staggered relation with respect to the gaps 5. These gaps provide for the segments being moved circumferentially with respect to one another. As the segments are moved toward one another, the connecting portions 4 are twisted a slight amount, and thereafter the connecting portions tend to resiliently spring back into their normally bent position, thus developing circumferential extensibility.

Numeral 7 refers to pieces of piston ring material which constitute filler or spacer elements. These filler elements are mounted between the upper row of segments 2 and the lower row of segments 3. Preferably, the filler elements are of a radial width corresponding to the radial width of the segments so as to extend from the outer peripheral edge of the ring to the inner peripheral edges of the segments. The filler elements may be arranged to overlap as many of the gaps or interstices 5 and 6 as may be desired, and in the ring 1 each filler element overlaps two adjacent segments.

The filler elements are formed with projecting ends or tongues 8 which extend radially inward between the doubled-over parts of each connecting portion. These tongues 8 are of the same circumferential width as the connecting portions 4 and are adapted to fill the space between the doubled-over parts of each connecting portion.

Integral with the filler elements 7 and also extending radially inward are other projecting ends or tongues 9 which are alternately bent upwardly and downwardly against the inner edges of the segments into overlapping relation with respect to points of separation of the segments. In the case of the segments 2, the upwardly bent tongues 9 overlap and seal the interstices 5, as may be readily observed from an inspection of Fig. 2. Similarly, in the case of segments 3, the downwardly bent tongues 9 overlap the interstices 5.

An important feature of the invention is the combination of pieces of piston ring material having tongue portions with a ring made up of connected segments as described. It is pointed out that in an internal combustion engine, there is a space between a cylinder and its piston. When a piston ring is seated in a piston ring groove of the piston, it must extend across this space, completely closing it. The gaps 6, however, at the under side of the ring of the invention, may provide a minute passageway for combustion gases to pass radially through the ring and escape downwardly between the cylinder and piston, with resultant loss of compression and other disadvantages. By the use of pieces of piston ring material or filler elements having tongues bent over against the inner edges of the segments, the gaps 6 are substantially closed, preventing passage of gas radially therethrough.

In addition to preventing leakage of combustion gases, it is desirable to prevent oil from being sucked upwardly around the ring during the suction stroke of the piston. Oil may be sucked through the ring by means of the upper interstices 5 when the ring is seated against the upper side of a piston ring groove. It should be observed, therefore, that the tongues 9, while not being necessary to seal the ring to combustion gases, close the interstices 5 and effect a desirable oil sealing action during the suction stroke of the piston.

Another feature of the invention consists in the increase in axial height of the ring which may be obtained by the use of the filler elements. Increase in axial height is advantageous for the reason that it allows the connecting portions to be more greatly spaced apart, in which position they are of improved resilient character. In addition, the filler elements are preferably arranged in a position so as to overlap the gaps 5 and 6 and thus prevent passage of gases axially through the ring.

It should be observed that in all cases, minute gaps or clearances 10 are preserved between each of the filler elements 7, and also minute spaces or gaps are provided between the tongues 9 and the connecting portions 4. This allows the segments 2 and 3 to continue to be circumferentially movable with respect to one another, and thereby to preserve the inherent flexibility of rings of the segmental construction described.

A preferred method of making the ring of the invention consists in cutting and bending a strip of resilient piston ring material, in the manner already outlined, to obtain upper and lower annular rows of segments and connecting portions for the segments.

A filler blank 11, cut along one edge to form tongues 8 and 9, is mounted between the folded-over edges of the ring 1, and the tongues 8 brought into alinement with the connecting portions 4. The tongues 9 may then be alternately folded upwardly and downwardly against inner edges of the segments of the respective rows in overlapping relation with respect to points of meeting of the segments. The blank 11 is provided of a width suitable to furnish tongues 9 which, when bent over, will extend throughout the axial height of the gaps of either of the rows and completely cover these openings. When the blank 11 is mounted between the segments as described, a marginal edge 12 is left extending radially outward from the outer periphery of the segments 2 and 3, as illustrated in Fig. 6. This marginal edge 12 is then removed in some suitable manner, as by grinding. Upon removal of the marginal edge in this manner, each of the filler elements 7, defined by the cuts 13, becomes separated from one another, thus completing the ring assembly.

It is intended that other types of filler elements may be resorted to. In Figs. 7–12 inclusive, for example, I have shown a ring 14 made up of segments 15, connecting portions 16, and filler elements 17. The filler elements in this ring modification are mounted in the spaces occurring circumferentially between the connecting portions 16, and in abutting relation with respect to the gaps. These filler elements have their inner ends rounded over to correspond to the inner peripheral surfaces of the connecting portions, and this forms a substantially continuous rounded inner periphery for the ring 1. The filler elements are formed with a wedge shape which, owing to the radially disposed position of the connecting portions, provides for locking the filler elements therebetween (Fig. 8). To prevent axial displacement of the filler members, additional locking means are provided, consisting of annular ribs 18 formed on the sides of the filler elements. To receive the annular ribs 18, the web portions 16 are formed with inwardly beveled edges 19. When these web portions are doubled over upon one another (Fig. 10), there are formed grooves in which the ribs or projections 18 may be locked. This effectively prevents axial displacement of the filler elements from between the connecting portions.

In making the ring illustrated in Figs. 7-12 inclusive, a strip of piston ring material is formed as illustrated in Fig. 11 and bent longitudinally of itself, with the segments 15 at one edge of the strip being superimposed upon segments 15 at the other edge of the strip. The longitudinally folded strip is filled in between its spaced-apart connecting portions with a blank 20, which is formed with filler portions 17 and a margin portion 21. These filler portions 17 are preferably of a thickness exceeding the axial thickness of the ring.

When the filler portions 17 have been engaged between the doubled-over connecting portions 16, pressure is applied axially against the ring at opposite sides to flow the metal of the filler portions 17, and force this metal against the beveled edges 19 of the connecting portions, thus forming the annular ribs or projections 18. Wedge-shaped filler elements may also be obtained by the flowing of metal. Thereafter the margin 21 may be removed, as by grinding or other means, to separate each of the filler portions in the manner already described.

Various other changes and modifications may be resorted to. For example, filler elements of the type illustrated in Figs. 7-12 inclusive may be utilized between the segments, as well as between the connecting portions, and other changes may be made.

It will be seen that I have disclosed piston ring assemblies having desirable means of sealing interstices, and increasing axial height, and filling in spaces between connecting portions. A plurality of pieces of piston ring material has been associated with a segmental piston ring in such manner as to resist displacement in directions either axially or radially of the ring. Several methods of quickly and cheaply forming the rings from sheet metal have been set forth, and an efficient, durable compression ring, adapted to exert a uniform wall pressure, has been provided.

While I have shown a preferred embodiment of my invention, it should be understood that various changes and modifications may be resorted to, without departing from the spirit of the invention as outlined by the appended claims.

I claim:

1. A circumferentially and radially flexible piston ring comprising a plurality of layers of piston ring material, each of said layers being separated by overlapping openings which form circumferentially movable segments and connecting portions for the segments, said connecting portions occurring in circumferentially spaced apart relation and being of a generally U-shaped cross section, a plurality of filler elements mounted in spaced-apart relation adjacent the said circumferentially movable segments.

2. A circumferentially and radially flexible piston ring comprising a plurality of layers of piston ring material, each of said layers being separated by radially extending openings which form circumferentially movable segments and connecting portions for the segments, each of said segments having connecting portions which are attached to two other segments, a plurality of filler elements mounted in the ring, said filler elements overlying openings between segments of one of the layers at inner peripheral edges thereof.

3. A piston ring comprising annular rows of circumferentially separated segments of resilient piston ring material, connecting portions for connecting the segments of one of the rows of segments to another of the rows, a plurality of pieces of piston ring material mounted between the rows of segments and extending throughout the radial width of the segments, said pieces of piston ring material presenting tongues bent over against inner peripheral edges of the segments between the said connecting portions of the ring.

4. A piston ring comprising upper and lower annular rows of circumferentially separated segments of resilient piston ring material, connecting portions for connecting the segments of one of the rows to segments of another of the rows, a plurality of filler elements mounted between the segments of the upper and lower annular rows, said filler elements presenting tongue portions which extend radially and then axially of the ring into overlapping relation with respect to points of separation of segments in one of the rows.

5. A piston ring comprising annular rows of circumferentially separated segments of resilient piston ring material, said rows of segments being superimposed one upon another, doubled over connecting portions extending radially inward and being arranged in circumferentially spaced-apart relation, said connecting portions further presenting beveled edges, a plurality of sealing elements mounted between the connecting portions and having circumferentially extending ribs engaged between the beveled edges of the doubled over connecting portions.

6. A piston ring comprising annular rows of separated segments of piston ring material superimposed one upon another, connecting portions for connecting the segments of one of the rows to segments of another of the rows, said connecting portions extending radially inward in spaced-apart relation with respect to one another, a plurality of wedge-shaped pieces of piston ring material mounted between the connecting portions and extending throughout the space therebetween.

7. A piston ring comprising a plurality of layers of resilient piston ring material, said layers including circumferentially spaced apart segments and U-shaped connecting portions for the segments, a plurality of filler elements mounted between the layers and being coextensive with the segments, said filler elements presenting inwardly extending tongues which are of the same circumferential width as the U-shaped connecting portions, said extending tongues being interposed between the sides of each of the U-shaped portions, said filler elements also including inwardly projecting ends which are bent over against inner peripheral edges of the said segments, and which overlie openings between adjacent segments.

8. A piston ring comprising a plurality of layers of resilient piston ring material, said layers including circumferentially spaced apart segments and U-shaped connecting portions for the segments, a plurality of filler elements mounted between the layers and being coextensive with the segments, said filler elements presenting inwardly extending tongues which are of the same circumferential width as the U-shaped connecting portions, said extending tongues being interposed between the sides of each of the U-shaped portions, said filler elements also including inwardly projecting ends which are bent over against inner peripheral edges of the said segments of each of the layers and which overlie openings between segments in each layer.

9. A piston ring comprising a plurality of layers of piston ring material, said layers including circumferentially spaced apart segments and connecting portions, a plurality of filler elements mounted between the layers and being coextensive with the segments, said filler elements presenting inwardly extending tongues which are interposed between the sides of each connecting portion, said filler elements also presenting sealing portions which overlie openings between adjacent segments in each of the layers.

THOMAS A. BOWERS.